United States Patent [19]

Pongratz

[11] Patent Number: 4,473,355
[45] Date of Patent: Sep. 25, 1984

[54] VISUAL SIMULATOR AND DISPLAY SCREEN FOR SAID SIMULATOR

[75] Inventor: Hans-Wolfgang Pongratz, Taufkirchen, Fed. Rep. of Germany

[73] Assignee: Messerschmitt-Boelkow-Blohm Gesellschaft mit beschraenkter Haftung, Munich, Fed. Rep. of Germany

[21] Appl. No.: 509,788

[22] Filed: Jun. 30, 1983

[51] Int. Cl.$^3$ .................... G09B 9/08; G03B 21/60
[52] U.S. Cl. ........................ 434/44; 350/125; 350/127
[58] Field of Search .......... 434/38, 40, 43, 44; 353/13; 350/122, 123, 125, 126, 127, 128, 322

[56] References Cited

U.S. PATENT DOCUMENTS

| | | | |
|---|---|---|---|
| 2,726,573 | 12/1955 | Maloff | 350/127 |
| 2,753,818 | 7/1956 | Green | 350/125 X |
| 2,883,763 | 4/1959 | Schaper | 434/43 |
| 2,999,322 | 9/1961 | Hemstreet | 434/43 |
| 3,712,707 | 1/1973 | Henkes, Jr. | 350/126 X |
| 3,902,787 | 9/1975 | Sherlock | 350/127 |
| 4,022,522 | 5/1977 | Rain | 350/125 X |
| 4,350,489 | 9/1982 | Gdovin | 434/40 |

FOREIGN PATENT DOCUMENTS 2101767  1/1983  United Kingdom ........... 350/128

Primary Examiner—William H. Grieb
Attorney, Agent, or Firm—W. G. Fasse; D. H. Kane, Jr.

[57] ABSTRACT

A visual simulator has a display screen forming a vault. Back-projectors are arranged outside of the screen vault which is transparent to project the image, such as an environment image into the vault which holds a training cockpit for training pilots or tank commanders. The screen is made of a single layer film or skin of plastic material having at least one projection field with a surface structure forming a Fresnel type collecting or converging lens having an optical axis pointing toward the cockpit. The screen may be supported by excess pressure in the vault. A self-supporting foldable tent may be provided inside the vault between the cockpit and the screen for providing access into the vault under the tent while still pressure supporting the screen skin, for example, for exchanging one type of cockpit against another.

15 Claims, 5 Drawing Figures

VISUAL SIMULATOR AND DISPLAY SCREEN FOR SAID SIMULATOR

BACKGROUND OF THE INVENTION

The invention relates to a visual simulator and a display screen for such simulator. Visual simulators are used for the training of aircraft and helicopter pilots or for other training purposes such as training a driver of a tank. Such training simulators save substantial amounts of money in obviating the need for expensive actual flight hours or driving hours. Further, such simulators have the advantage that the simulator equipment does not need to be exposed to the high, rigorous requirements which occur in actual training as compared to simulated training.

Visual simulators which comprise a plurality of collimators each having its own independent image channel, and which provides a virtual image display in the infinity are very expensive. Another type of prior art visual simulator displays the artificial environment as a real image on a vaulted projection screen by projector means installed inside the vault formed by the screen. This latter type of simulator is subject to the problem that it is difficult to install the projector means in a space which is required for the cockpit of the simulator in the center of the vault. As a result, the visibility range is curtailed and very expensive image correction distortion means must be employed. Such correction means are required, especially when large fields of view are to be simulated in a manner true to nature, for example, if the field of view is to cover more than 180° in the horizontal direction and more than 90° in the vertical direction.

OBJECTS OF THE INVENTION

In view of the above it is the aim of the invention to achieve the following objects singly or in combination:

to provide a visual simulator which can be constructed economically as far as its structural and control features are concerned, while still enabling the display of an environment in a true-to-nature manner;

to provide an inexpensive visual simulator capable of providing a large field of view with a substantial angular range in the horizontal and vertical directions without any curtailment of the visibility, while simultaneously providing a high resolution of the displayed image;

to provide a high image quality while still using only a small number of external, so-called back projectors, and dividing the projection screen into a respectively small number of projection fields;

to provide a screen for the present purposes which will assure a good image contrast by especially reducing any stray effects;

to avoid an excessive decrease in the brightness of the displayed image toward the edges of the screen;

to provide a substantially uniform illumination of the display screen, including the illumination of the rim zone toward the edges of the screen;

to make sure that any misalignment or displacement between adjacent individual image portions on the display screen are less conspicuous; and to provide an inflatable vaulted projection screen which forms an accessible vault without collapsing even if components inside the vault need to be exchanged.

SUMMARY OF THE INVENTION

The visual simulator according to the invention comprises a projection screen forming a vault for enclosing a cockpit.

The projection screen is constructed as a so-called back-projection screen having a thin walled vault skin. Projection means including one or more projectors are arranged externally or radially outwardly of the vault formed by the transparent thin walled screen. The at least one external projector projects a simulated environment image on a limited projection field. The screen skin is provided on its inside in each projection field with a Fresnel type collecting or converting lens having an optical axis pointing toward the cockpit. The Fresnel type lens has a profiled surface structure, preferably in the form of grooves extending with a circular symmetry relative to the optical axis of the Fresnel type lens. The groove profile is constant over the entire projection field of the respective Fresnel type lens.

The visual simulator according to the invention provides an image display over a field of view covering a large angular range without any distortion or impairment of the all around view which is displayed with an excellent image quality due to the external projection of the image onto the domed or vaulted projection screen and due to the special construction of the Fresnel type lenses forming the surface structure of the vaulted screen. In spite of these advantages the simulator according to the invention requires but a few externally arranged projectors and a respectively small number of individual projection fields on the so-called back projection screen forming the vault skin.

In connection with this type of back-projection screens which achieve a good image contrast, that is, a relatively small stray effect, it was necessary heretofore to accept a substantial brightness decrease toward the edges of the respective projection field. The invention avoids this problem in that the Fresnel type lens structure is integrated into the vault forming screen. Such a structure has, in addition to the optical advantage, also substantial manufacturing advantages because such lenses do not need to be produced any longer with a high accuracy due to the small wall thickness of the vault forming skin. Contrary thereto, field lenses capable of an equivalent function require a high optical accuracy and a correspondingly large manufacturing effort. Actually, such field lenses have been customarily produced only for plane projection surfaces having comparatively small dimensions, for example, a maximum lens diameter of about 2 m.

BRIEF FIGURE DESCRIPTION

In order that the invention may be clearly understood, it will now be described, by way of example, with reference to the accompanying drawings, wherein.

Figure 1:
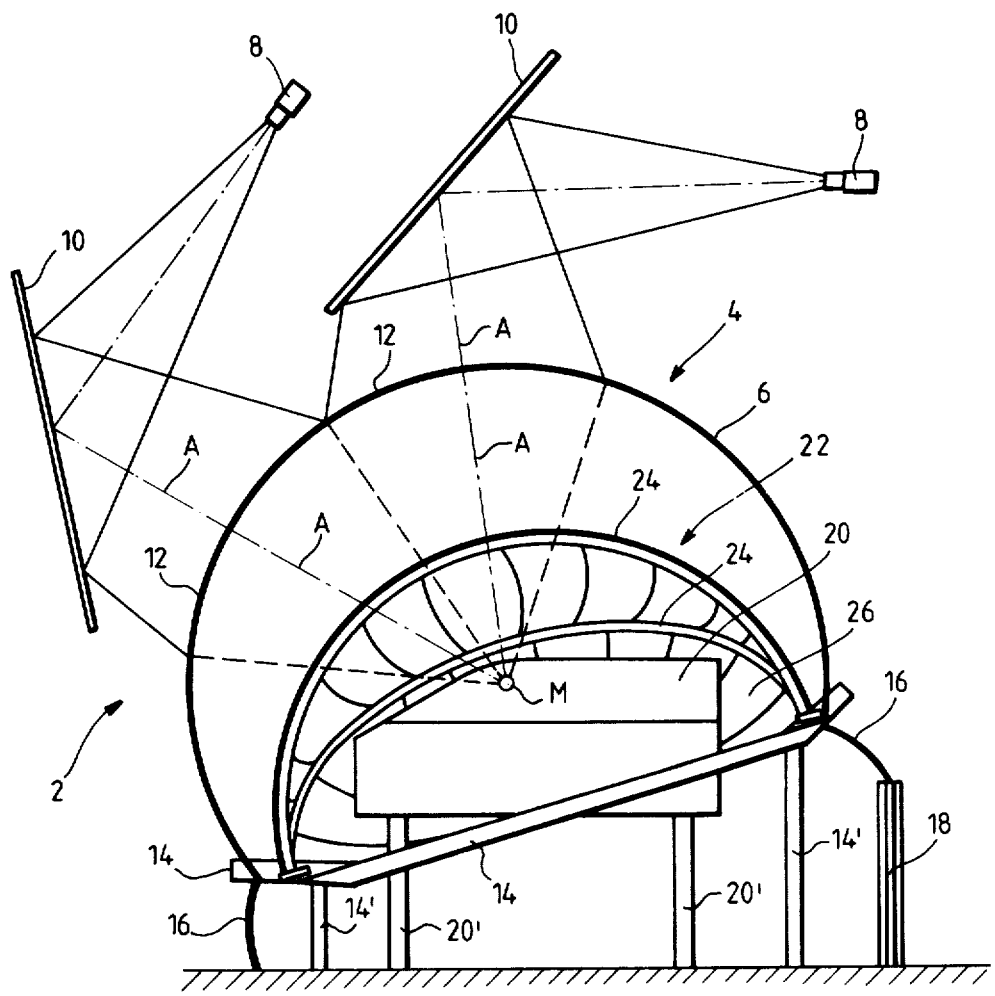
FIG. 1 is an elevational side view of a simplified illustration, partially in section, of a visual simulator according to the invention, including a foldable inner tent.

DETAILED DESCRIPTION OF PREFERRED EXAMPLE EMBODIMENTS AND OF THE BEST MODE OF THE INVENTION:

FIG. 1 illustrates a visual simulator 2 which is inflatable to form, for example, a spherical vault 4 enclosed by a thin walled, single layer vault screen skin 6 made of a polycarbonate film having a relatively small degree of light scattering. Light scattering particles, not shown, are embedded in the mass of the polycarbonate film to achieve a matted or dulled effect. The skin of the vault 4 is sufficiently transparent to form a so-called back projection screen. At least one, preferably a plurality of back-projectors 8 are arranged externally of the vault 4 and deflection mirrors 10 are arranged for deflecting the image projecting beams onto the screen skin 6. This type of radial projection produces a real image on the skin 6, thereby displaying a simulated environment to a person inside the vault 4, for example, in a cockpit 20.

According to the invention the vault skin 6 is divided into a plurality of neighboring projection fields 12. Each projection field 12 cooperates with one external projector 8. Each projection field 12 has a surface configuration forming a Fresnel type collecting or converging lens as will be described in more detail with reference to FIGS. 2 to 5. Each Fresnel type collecting lens has an optical axis A pointing toward the center M of the vault.

The vaulted or domed screen skin 6 is secured to a support ring 14 in an airtight manner. The support ring 14 in turn is mounted above the ground, for example, on vertical legs 14' and a flexible skirt 16 seals the domed structure relative to the floor or ground on which the simulator is installed. Access means such as a closable door flap 18 are provided in the skirt 16 for closing the space inside the vault and inside the skirt 16 in a pressure tight manner. A pressure equalization passageway, not shown, may be provided in front of the doors 18 so that persons may enter and leave the vault. The cockpit 20 supported on legs 20' in the center of the vault 4 may be exchanged by another type of cockpit through the door 18, if the cockpit is small enough.

In order to make sure that the dome or vault 4 remains pressure supported if a big cockpit 20 is being exchanged, the invention provides inside the vault and above the cockpit 20 an inner tent 22 which is foldable upwardly into an operating position and downwardly into a folded position so as not to normally interfere with the projection purposes. The inner tent 22 comprises a plurality of circular, arched support struts 24 which are pivoted or journalled to the support ring 14. A foldable, airtight covering 26 is secured to these arched struts 24 which make the inner tent 22 self-supporting. During simulations the inner tent 22 is folded back to avoid impairing the view. When it is necessary to replace or remove the cockpit 20, the inner tent 22 is closed, thereby closing the space between the inner tent 22 and the vaulted screen skin 6 in an airtight manner so that even the skirt 18 may be opened without any pressure loss in the just mentioned space between the tent 22 and the skin 6.

Figure 2:
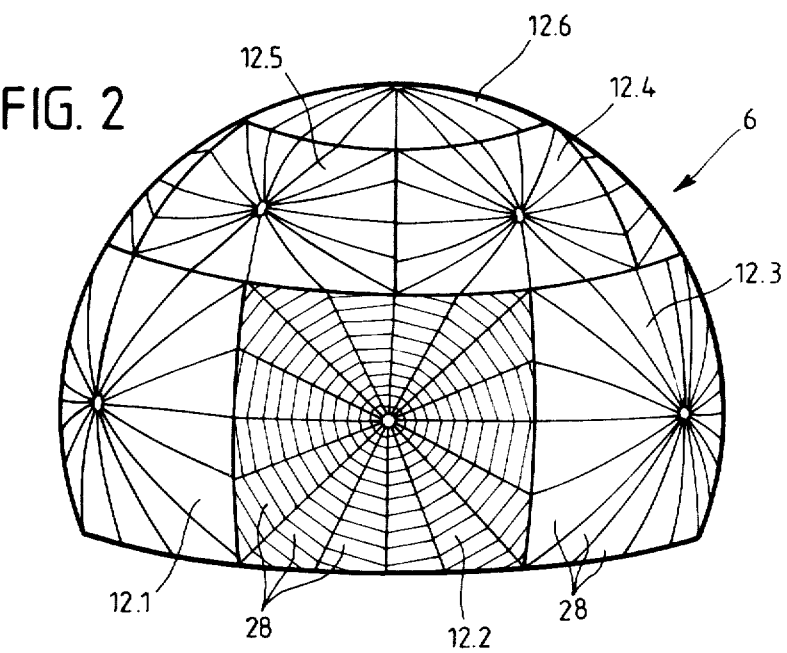
FIG. 2 is a perspective view of a plurality of neighboring projection fields into which the vault forming screen is divided, each projection field having a Fresnel type lens surface structure.

Fig. 2 illustrates a perspective view of the domed screen skin 6 divided into a plurality of projection fields 12.1 to 12.6 assembled to form a spherical dome or vault. Each projection field has a surface structure in the form of a Fresnel type collecting lens having an optical axis relative to which the surface structure is symmetrical as shown only for the projection field 12.2. All other fields are constructed in the same way.

Figure 3:
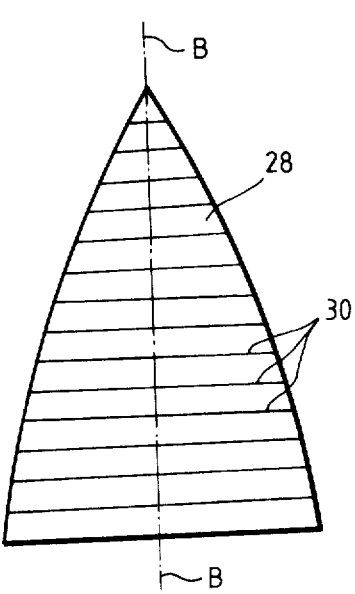
FIG. 3 is a plan view of a plane individual element of the vault forming image screen skin.

FIG. 3 shows one sector 28 of a plurality of such sectors which are identical to each other and which have the shape of a plane development of a spherical sector surface as shown at 28 in FIG. 3. Each spherical sector surface is provided with grooves 30 extending perpendicularly to the center line B—B which is also the section line for FIG. 4. These individual sector surfaces 28 are assembled in the manner of an umbrella to form a spherical cap or vault. After such assembly the assembly sector surfaces 28 are cut to the size of the respective projection field 12. The cobweb type groove structure as shown for the projection field 12.2 in FIG. 2 resulting from the just described assembly forms a Fresnel type collecting lens having an optical axis A—A shown in FIG. 5 and extending to the center M (FIG. 1) of the vault.

Figure 4:
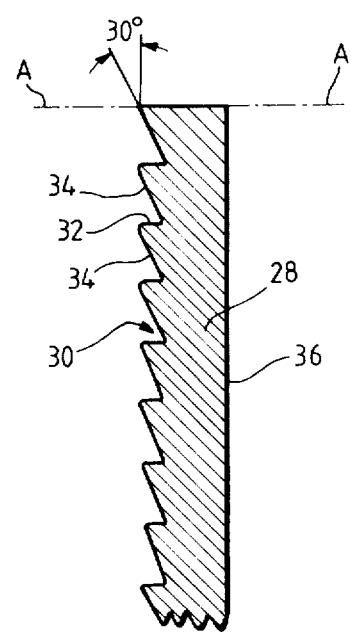
FIG. 4 is a sectional view along section line B—B in FIG. 3 showing an individual image screen element on a substantially increased scale.

FIG. 4 shows on an enlarged scale, the groove profile which, according to the invention, achieves an improved brightness distribution. The groove profile is constant over the circular length of a groove and has a saw-tooth configuration, whereby the groove depth corresponds to about ¼ to ½ of the thickness of the film forming the sector 28 of polycarbonate synthetic material. The corners between the tooth flanks 32 and the back 34 of the respective tooth of the individual grooves are rounded with a small rounding radius. The angle of inclination of the tooth back 34 relative to the outer surface 36 of a sector 28 is normally above 25° and preferably within the range of 30° to 45°. The tooth flanks 32 are aligned with a line representing the optical axis A—A so that the tooth flanks of each individual sector 28 extends substantially perpendicularly to the respective outer surface 36. Accordingly, when the vault forming screen skin 6 is inflated, all tooth flanks 32 extend in the direction of the center M of the spherical vault M as shown in FIG. 5 by the dash-dotted lines.

Figure 5:
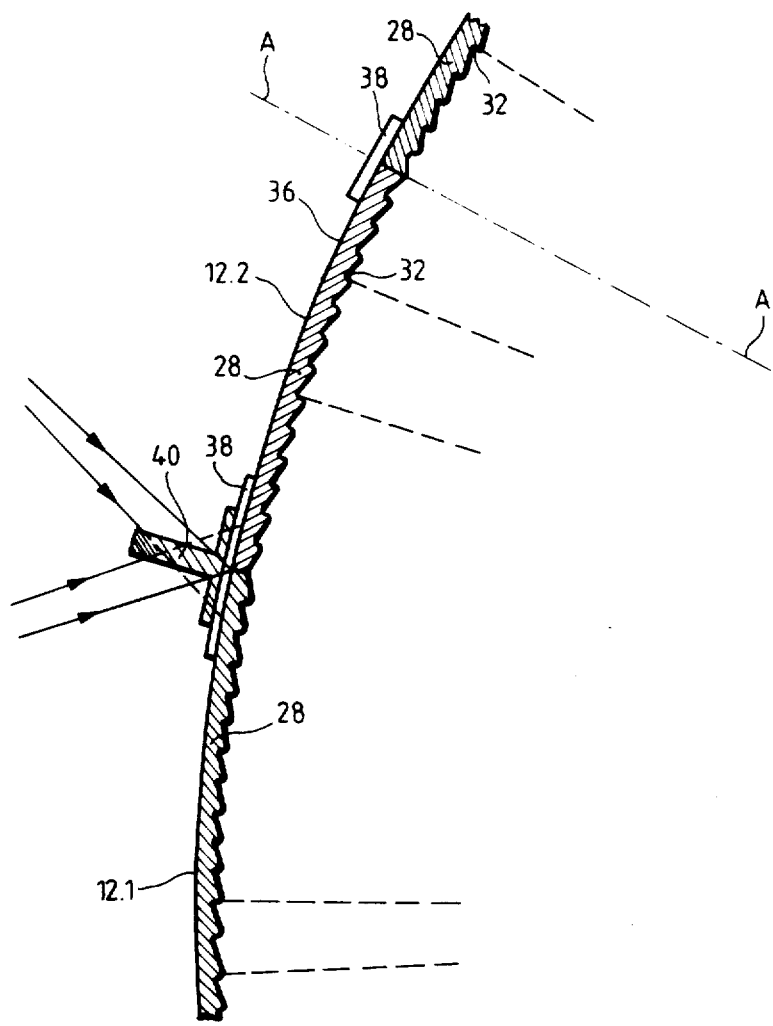
FIG. 5 is a sectional view through the image screen skin in its inflated condition, whereby the section extends through a zone or seam between two abutting projection fields.

The individually cut sectors 28 are assembled in an abutting manner along their edges and interconnected on the outer side 36 with a glass clear, transparent adhesive tape 38 as shown in FIG. 5.

FIG. 5 further shows that radially outwardly projecting ridges 40 are arranged along the seams between adjacent projection fields 12. These ridges 40 extend radially outwardly to a height of about 2 to 70 cm. Directly adjacent the skin 6 the ridges 40 are fully transparent, but they have an opacity which increases radially outwardly in the manner of a gray filter. At the radially outer edge of the ridges 40, the latter are completely opaque so that they represent a nonreflecting black ridge. Due to this structure of the ridges 40 the light of a projector 8 cooperating with a respective projection field 12 illuminates a narrow strip or margin in the adjacent neighboring projection field, whereby a smooth transition from projection field to projection field is accomplished, thereby reducing any effects that otherwise might result from a displacement or misalignment of adjacent image sections.

The screen according to the invention achieves a high image brightness and an improved image contrast due to the convergent or collective Fresnel type lenses which are profiled as taught herein with a constant groove profile as opposed to conventional Fresnel lenses. The Fresnel type lenses according to the invention may be formed on the polycarbonate synthetic material of the vaulted screen skin 6 by a pressing or stamping operation in each of the projection fields 12. Due to this constant groove profile the projecting beams of the respective projector 8 are defracted toward the vault center M, whereby the constant groove profile in combination with the relatively high transparency of the material forming the skin 6 and in combination with the relatively small stray or scattering angle, a high gain is achieved which guarantees said image brightness uniformly substantially over the entire screen surface. Yet another advantage of the invention is seen in the arrangement of the image projectors 8 radially outwardly so that the optical axis A—A of each Fresnel type collecting lens profile of each spherical projection field 12 coincides with the radial projection by the respective outer back projector 8, whereby a very simple distortion correction may be used. Such distortion correction is of circular symmetry relative to such radial projection and may be accomplished, for exammple, by arrangement of spherical predistorting lenses in the projection optical means.

The above described features of the present Fresnel type collecting lenses with a circular symmetry of the grooves 30 not only greatly simplifies and therefore reduces the costs of the manufacturing as mentioned above, it also achieves, in addition to the mentioned improved brightness distribution a depression of the bright spot appearing in the image center of the systems using conventional lentil shaped Fresnel lenses. Additionally, this present lens structure achieves an improved illumination of the rim zones of each projection field.

Another advantage of the invention is seen in that an automatic masking effect is achieved by the individual projection field relative to light from adjacent projectors cooperating with adjacent projection fields. This is so because the collecting effect of the Fresnel type lens surface structure results in the perceiving of an amplified image brightness relative to the projection or optical axis A—A at the cockpit 20. This amplified brightness is effective only relative to the corresponding optical axis, whereas light from a neighboring projector projecting into an adjacent projection field 12 is weakened because the Fresnel type lens structure functions as a light scattering lens relative to light coming from such a direction. Due to this feature in combination with the small scattering degree of the screen skin 6 only a relatively small light quantity is scattered in the direction toward the cockpit 20. This masking effect is even enhanced by the saw-tooth type configuration of the grooves when the teeth flanks are aligned with lines pointing toward the center M so that light emanating from the flanks 32 is not perceived in the cockpit 20.

The above described ridges 40 with the mentioned characteristics permit a superimposed projection along the boundaries between two adjacent projection fields 12. This feature enhances the masking effect which automatically masks out scattering light and color seams of a higher order at the boundaries between adjacent projection fields. The same features simultaneously permit the smooth transition between adjacent projection fields 12 so that dark gaps between image sections are avoided and any displacement or misalignment between adjacent or neighboring image portions is made less visible. These features, or rather, this masking according to the invention has the further advantage that the projectors may be equipped with simpler optical projection means because for this purpose it is not necessary to produce a real intermediate image for each projector.

It is possible to construct the screen skin 6 to comprise several layers, one of which is a thin walled, glass clear transparent inner layer provided with the Fresnel type lens grooves while the other outer layer is a light scattering layer and both layers are made of the screen material such as polycarbonate. However, it is preferred to make the screen skin 6 as a single layer in the body or mass of which light scattering particles have been embedded to provide the polycarbonate film with a matting or dulling effect. This film is directly provided with the Fresnel type lens surface structure with the described grooves 30, for example, by an impressing operation. It has been found that these features are not only easy to realize in a manufacturing practical sense, they also improve the image quality because, due to the light scattering in the Fresnel type lens, reflections between the individual profile surfaces are not visible. Nevertheless, the film forming the image screen 6 may be very thin,, which in turn has the advantage of achieving a large resolution. The embedding of light scattering particles in the image screen film has the further advantage that no specific requirements must be met by the surface quality of the groove structure because it is not necessary to produce optically clear surfaces.

The mentioned cutting of the individual projection field sectors 28 and their assembly and connection by an adhesive transparent tape further reduces the manufacturing expenses. The costs for the pressing or injection molding tools such as molds in which the sections of the screen skin 6 are formed are substantially lowered as compared to molds for making the vaulted or domed screen as a single piece. Nevertheless, the abutting seams with the transparent tape result, surprisingly, in an optically clean connection between the individual sections 28.

An advantage of the spherical shape and of the projectors arranged radially outwardly, one for each projection field, is seen in that any image distortions are of circular symmetry relative to the projection axis, whereby the distortion is easily corrected by spherical lenses in the projector systems.

In the embodiment in which the individual sections 28 have the shape of umbrella sections, the costs are even further reduced because only a single, relatively small pressing mold is required for making a plurality of identical sections 28.

The provision of an inner tent in the dome or vault has the advantage that the cockpit may easily be exchanged without collapsing the projection screen. Such exchange is not easily possible where merely a personnel pressure equalization entrance is provided having regard to the substantial size and bulkiness of such cockpits.

Although the invention has been described with reference to specific example embodiments, it will be appreciated, that it is intended, to cover all modifications and equivalents within the scope of the appended claims.

What is claimed is:

1. A visual simulator apparatus for simulating an image for a training cockpit comprising a back projection screen forming a vault for substantially surrounding a training cockpit inside said vault, outer back-projector means operatively arranged outside said vault for projecting an image onto said screen, said screen comprising a thin skin having at least one projection field, said thin screen skin comprising on its inside facing the cockpit and in said projection field a surface structure forming a Fresnel type converging lens having an optical axis pointing toward the cockpit, said thin skin being sufficiently transparent.

2. The simulator apparatus of claim 1, wherein said Fresnel type converging lens of each projection field comprises grooves extending with a substantially circular symmetry relative to said optical axis, said grooves having a groove cross-sectional shape which is constant over the entire projection field.

3. The simulator apparatus of claim 2, wherein said cross-sectional shape of said grooves has a saw-tooth configuration arranged so that respective tooth flanks are located on lines extending toward the cockpit.

4. The simulator of claim 1, wherein said projection screen comprises a plurality of projection fields, and wherein said back-projector means comprise a plurality of back-projectors corresponding in number to the plurality of projection fields, so that each back-projector cooperates with its respective projection field, said projection screen further comprising radially outwardly extending ridges bounding the projection fields and having a radially outwardly increasing opacity.

5. The simulator of claim 1, wherein said thin skin of said projection screen comprises a single layer of a polycarbonate film, and light scattering particles embedded in said film for providing a matted or dulled effect.

6. The simulator of claim 1, wherein said thin skin of said projection screen comprises a plurality of skin sections, and clear transparent adhesive tape strips holding said skin sections together.

7. The simulator of claim 1, wherein said screen vault is a spherical vault and wherein said outer back-projector means are arranged for a radial projection onto said projection field.

8. The simulator of claim 1, wherein said screen comprises a plurality of projection fields each constituting a development of a sector of a spherical surface, all sectors being substantially identical to each other, said sectors having straight grooves forming said Fresnel type converging lens.

9. A visual simulator apparatus for housing cockpit means, comprising an inflatable projection screen forming a vault surrounding said cockpit means, support frame means, means securing said screen to said support frame means in an airtight manner, projection means operatively arranged for projecting an image onto said projection screen, inner tent means inside said vault, said inner tent means being foldable into an operative position between the cockpit means and said projection screen for closing off the cockpit means in an airtight manner from said screen, said inner tent means being self-supporting in said operative position for maintaining the internal pressure in said vault even when the space in said inner tent is opened, skirt means operatively connected to said support frame means for closing off said support frame means in an airtight manner, and access means in said skirt means for providing access into said inner tent means when said inner tent means are folded into an operative position.

10. The apparatus of claim 9, wherein said inner tent means comprise bow shaped support struts hinged to said support frame means, and airtight foldable covering means secured to said bow shaped struts.

11. The apparatus of claim 9, wherein said support frame means comprise frame members elevating said frame means above the ground, said skirt means extending downwardly from said frame means, and wherein said access means comprise flap means closable in an airtight manner and openable for providing access into said inner tent means.

12. The apparatus of claim 10, wherein said support frame means comprise frame members elevating said frame means above the ground, said skirt means extending downwardly from said frame means, and wherein said access means comprise flap means closable in an airtight manner and openable for providing access into said inner tent means.

13. A projection screen for a visual simulator, comprising arched support means, a thin skin carried by said arched support means to form a screen enclosing a space inside which an image is visible on said screen, said thin skin comprising on its surface facing into said space at least one projection field, said projection field having a surface structure forming a Fresnel type collecting lens having an optical axis pointing substantially into the center of said space.

14. The screen of claim 13, wherein said screen is inflatable.

15. The screen of claim 14, further comprising a self-supporting foldable tent inside said space, means operatively interconnecting said tent to said screen in an airtight manner for inflating the space between said screen skin and said tent, and access means into said tent for providing access into said tent while keeping the space between the screen and the tent inflated.

* * * * *